United States Patent [19]

Deeg

[11] 4,022,628
[45] May 10, 1977

[54] ION EXCHANGE-STRENGTHENED SILICATE GLASS FILTER FOR ULTRAVIOLET LIGHT

[75] Inventor: Emil W. Deeg, Woodstock, Conn.

[73] Assignee: American Optical Corporation, Southbridge, Mass.

[22] Filed: Sept. 5, 1975

[21] Appl. No.: 610,608

[52] U.S. Cl. .................................. 106/52; 65/30 E
[51] Int. Cl.² ........................ C03C 3/30; C03C 3/04; C03C 21/00
[58] Field of Search ............ 106/52, 47 Q; 65/30 E; 252/300

[56] References Cited

UNITED STATES PATENTS

| | | | |
|---|---|---|---|
| 2,647,068 | 7/1953 | Patai et al. ........................ | 65/30 E |
| 3,424,567 | 1/1969 | Smith ................................ | 65/30 E |
| 3,495,963 | 2/1970 | Buckley et al. .................... | 65/30 E |
| 3,533,888 | 10/1970 | Eppler et al. ...................... | 351/166 |
| 3,790,260 | 2/1974 | Boyd et al. ........................ | 351/166 |
| 3,898,693 | 8/1975 | Faulstrich et al. ................. | 106/54 |
| 3,899,315 | 8/1975 | Seigmund ......................... | 65/31 |
| 3,923,486 | 12/1975 | Kitano et al. ...................... | 65/30 E |

*Primary Examiner*—Winston A. Douglas
*Assistant Examiner*—Mark Bell
*Attorney, Agent, or Firm*—William C. Nealon; H. R. Berkenstock, Jr.

[57] ABSTRACT

There is provided by the process of the invention a silicate glass which provides protection against mechanical hazards and short and long wavelength ultraviolet radiation while at the same time high transmission of light in the visible range of the spectrum is maintained. By the process of the invention, the incorporation of cerium oxide into the glass followed by ion exchange strengthening using a mixture of potassium salt and silver nitrate provide a synergistic reduction in transmission of light in the ultraviolet range of the spectrum not heretofore obtainable by the use of either cerium oxide or silver staining of the glass alone.

8 Claims, 2 Drawing Figures

ION EXCHANGE-STRENGTHENED SILICATE GLASS FILTER FOR ULTRAVIOLET LIGHT

BACKGROUND OF THE INVENTION

1. Field of the Invention:

This invention relates to protective eyewear such as goggles and safety glasses which can be of the prescription or non-prescription type. The invention finds particular use for the protection of persons exposed to the ultraviolet radiation produced during the process of electric arc welding.

2. Description of the Prior Art:

It is known to incorporate cerium dioxide into glass particularly for use in spectacle lenses to provide increased absorption of ultraviolet radiation in the wavelength range below about 350 nanometers. Such lenses are used, for instance, where it is desirable to protect the eyes against ultraviolet radiation present in sunlight at high altitudes, emanating from fluorescent type lighting fixtures or other ultraviolet light sources.

The use of cerium in glass has also been described by Weyl in the book *Colored Glasses* published by Society of Glass Technology, Sheffield, England, 1967, pages 229–234. Light absorption of a lead crystal glass containing cerium oxide and titanium oxide is shown on page 233 to be greatest between 500 and 700 nanometers wavelength.

It has long been known that silicate glasses can be stained by exposing them to specific mixtures of chemicals at elevated temperatures. In U.S. Pat. No. 3,424,567, there is described a process for staining a borosilicate glass which is free of reducing agents by employing glass staining compositions such as cuprous sulfide, silver oxide, vanadium pentoxide, zinc sulfide and calcium sulfite. The coloration is said to be produced as a result of the migration of the silver and copper ions into the glass structure in exchange for the alkali metal ions of the glass composition in the vicinity of the stained area. There is no indication that the exchange of alkali metal ions for silver and copper ions produces a stained glass composition having reduced ultraviolet absorption characteristics.

SUMMARY OF THE INVENTION

By the process of the invention, silicate glass compositions can be prepared exhibiting absorption of ultraviolet light having a wavelength below about 400 nanometers without substantial reduction in transparency to visible light having a wavelength above 400 nanometers. By the incorporation of cerium oxide into a silicate glass, it has been found that said glass upon subsequent ion exchange at elevated temperatures using a combination of a potassium salt and a silver salt that a synergistic increase in absorptivity of ultraviolet light having a wavelength below 400 nanometers can be obtained which is substantially greater than the cumulative absorption which can be obtained by use of either the cerium oxide or ion exchanging with a combination of a potassium salt and a silver salt.

DESCRIPTION OF THE DRAWING

There are shown in FIG. 1 curves indicating the percent transmission over wavelengths between 300 and 1000 nanometers. Curve 1 illustrates the absorptivity of a silicate glass forming no part of the invention but similar to the glass compositions of the invention with the exception that the glass composition having the transmission characteristics shown in FIG. 1 curve 1 contains no cerium oxide. The absorption characteristics of the same glass after ion exchange treatment of period of 30 minutes at a temperature of 400° C in a bath consisting of 90 weight percent potassium nitrate and 10 weight percent silver nitrate are shown in FIG. 1, curve 2. It will be noted that there is a substantial reduction in transmission of visible light between the wavelengths of 400 and 700 nanometers subsequent to ion exchange treatment.

In FIG. 2, curve 3 indicates the percent transmission of said glass prior to ion exchange treatment and FIG. 2, curve 4 illustrates the percent transmission of the same glass subsequent to ion exchange treatment for a period of 30 minutes at 400° C in a bath consisting of 90 percent by weight potassium nitrate and 10 percent by weight silver nitrate. The glass compositions characterized in FIGS. 1 and 2 are those described in Examples I and II respectively. It will be noted that the percent transmission of the glass shown in FIG. 2 subsequent to ion exchanging as described above is close to 0 percent up to a wavelength of about 500 nanometers and thereafter increases sharply to about 70 percent transmission at 700 nanometers wavelength. As such, the glass of FIG. 2 would provide the filtering characteristics desired in a glass used to filter out the harmful ultraviolet wavelength light emanating from an electric arc welding device. It should be noted that the curves of FIGS. 1 and 2 were obtained on glasses having a sample thickness of about 2 millimeters.

DESCRIPTION OF THE PREFERRED EMBODIMENTS

Figure 1:
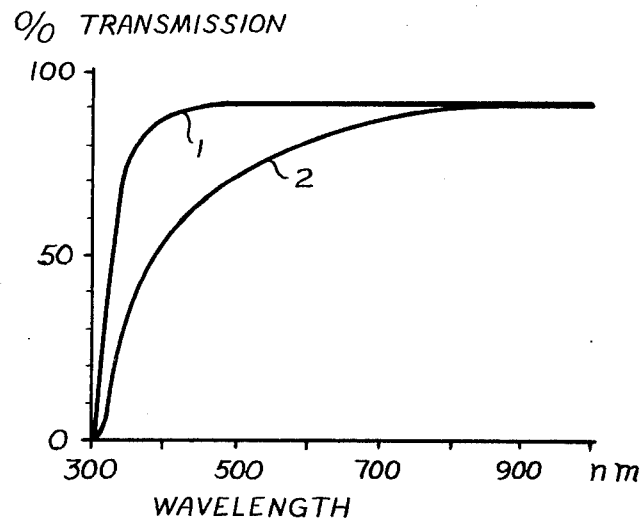

In accordance with the present invention, a method is provided for the preparation of a silicate glass suitable for use as a filter for ultraviolet light which specifically absorbs light below about 400 nanometers and passes a high proportion of light above 400 nanometers. The silicate glass compositions of the invention are similar in composition to conventional ophthalmic crown glass but are modified to include a proportion of cerium oxide of about 2 to about 10 percent. Cerium oxide is unique in providing a glass composition which, in accordance with the process of the instant invention, can be ion exchanged using a bath containing a potassium salt and a silver salt to provide the ultraviolet light filtering glasses of the invention. The ion exchange process of the invention comprises the exchange of sodium ions present in the glass for potassium and silver ions present in the ion exchange bath. The ion exchange treatment can be conducted at temperatures either above or below the strain point of the silicate glass containing cerium oxide; suitable ion exchange being obtained either at a temperature above or below the strain point of the glass and suitable strengthening being obtained simultaneously so as to provide not only a silicate glass capable of filtering ultraviolet light but a strengthened glass as well. Such glasses are eminently suitable for use in the protection of those persons exposed to a combination of mechanical hazards present in an industrial environment and the high intensity ultraviolet light produced by electric arc welding processes.

The cerium oxide is incorporated into the silicate glass composition of the invention in a conventional manner by mixing batch constituents together and subsequently melting the batch components in an electrically heated glass melting furnace at a temperature of about 1400° C. It serves also as a fining agent thus eliminating the need for addition of oxides of antimony and/or arsenic to the batch. In accordance with conventional practice, the glass compositions are maintained at the above glass melting temperature for about 16 to about 20 hours and during the last portion of this time stirred mechanically to insure that the composition is homogeneous and free of bubbles and unmelted matter so as to be of acceptable quality for the production of an ophthalmic lens. After conditioning the melt for about 2 hours at a furnace temperature of about 1,300° C, the glass is cast and subsequently transferred to an annealing furnace and cooled to approximately 100° C at a rate of approximately 2° C per hour to provide an annealed glass. Glasses according to the invention can also be melted in continuously operated tank furnaces.

The ion exchange process of the invention which can take place at a temperature either above or below the strain point of the glass involves the use of a potassium salt bath to which is added an appropriate amount of a silver salt. The strengthening of the glass is believed to take place as the result of the replacement of the sodium ions of the glass with the larger potassium ions present in the salt bath. The silver ions present in the bath upon exchange contribute absorptivity to the glass and the proportion of silver salt in the bath is desirably decreased where the ion exchange process is conducted over a substantial period of time as is usually the case where the ion exchange process is conducted at a temperature below the strain point of the glass. Satisfactory results have been obtained by the use of a potassium salt in the amount of between about 80 to 99 percent together with 1–20 percent silver salt. Preferably, the potassium salt is potassium nitrate and the silver salt is silver nitrate although other appropriate salts of potassium and silver can be used. There is no known replacement or substitute for the silver ion to provide the required absorption of the glass obtained during the ion exchange process of the invention. Further details with respect to ion exchange of an ophthalmic glass lens to provide a strengthened glass lens by an ion exchange treatment at a temperature below the strain point of the glass can be found in U.S. Pat. No. 3,790,260 hereby incorporated by reference. Generally, the ion exchange treatment is conducted by immersing the lens in a molten salt bath containing potassium and silver ions which consists substantially of potassium nitrate, potassium sulfate or a mixture thereof, said salt bath being maintained at an elevated temperature either above or below the glass strain point. Where the ion exchange treatment is conducted at a temperature below the glass strain point in order to avoid release of the compressive stresses generated, the ion exchange treatment is generally conducted at temperatures of from about 20° C to about 120° C below the strain point of the glass. However, the temperature at which the exchange is conducted preferably is at least about 350° C. It has been noted that the thickness of the ion exchange layer increases approximately in proportion to the square root of the treating time. By conducting the ion exchange treatment at a temperature below the strain point of the glass, the stressed surface layer is obtained in a thickness of about 60 to about 140 microns and the compressive stress obtained is about 20,000 to about 50,000 pounds per square inch. Ion exchange treatment conducted at a temperature above the strain point of the glass provides increased depth of penetration and a correspondingly reduced compressive stress. Corresponding values are a thickness of the compressed surface layer of about 70 to about 170 microns and compressive stress of about 14,000 to about 45,000 pounds per square inch. The strengthening is directly proportional to the compressive stress value at the depth of the strength controlling flaws. Therefore, deeper penetration of compressive stress provides greater protection for deep surface flaws.

The ion exchange treatment of the glass of the instant invention is not limited to treatment at a temperature either above or below the strain point of the glass. At treatment temperatures preferably ranging from about 350° C to about 450° C which temperatures are well below the softening point for the glass compositions of the invention, suitable strengthening and absorption characteristics are obtained.

The strain point of the silicate ophthalmic crown glass compositions is at or above a temperature of 390° C. The ion exchange temperature utilized can be from about 350° C up to about 450° C. Where a temperature below the strain point of the glass is utilized, a longer period of treatment is usually required while where the temperature is above the glass strain point a relatively shorter period is required in order to obtain equivalent strength and degree of absorption of ultraviolet light in the desired wavelength range. Where strengthening the glass is a secondary consideration, a treatment time of about 30 minutes at a temperature of about 400° C has provided satisfactory strength and ultraviolet light absorption. Where increased strength is required in the glass composition, a time of up to 4 hours at a temperature of 400° C may be necessary. Where longer times are utilized, excessive darkening of the lenses as the result of silver staining can be avoided by utilizing a reduced silver nitrate concentration in the ion exchange bath. For instance, where a 30 minute treatment is utilized, a concentration of 10 weight percent silver nitrate and 90 weight percent potassium nitrate can be utilized while where a time of 4 hours is required to obtain the desired strengthening the concentration of silver nitrate is desirably reduced to about 1 percent silver nitrate and 99 percent potassium nitrate. Longer periods of ion exchange such as times of between 12 and 16 hours at a temperature of 400° C. have also produced lenses possessing both optimum strength and absorption of ultraviolet light.

The ophthalmic glass composition which is ion exchange treated according to the process of the invention is a silicate glass composition having the proportions on the oxide basis in weight percent as follows:

| Ingredient | Wt. % |
| --- | --- |
| $SiO_2$ | about 64 to about 75 |
| $K_2O$ | about 5 to about 10 |
| $Na_2O$ | about 4 to about 8 |
| CaO | about 4 to about 8 |
| $Al_2O_3$ | up to about 2 |
| ZnO | up to about 3 |

| Ingredient | Wt. % |
| --- | --- |
| TiO$_2$ | up to about 0.5 |
| CeO$_2$ | about 2 to about 10 |

A preferred embodiment of the glass composition of the invention is a glass having a composition on the oxide basis as follows:

| Ingredient | Wt. % |
| --- | --- |
| SiO$_2$ | 65.4 |
| Na$_2$O | 7.9 |
| K$_2$O | 8.5 |
| CaO | 8.0 |
| Al$_2$O$_3$ | 1.8 |
| ZnO | 2.8 |
| TiO$_2$ | 0.5 |
| CeO$_2$ | 5.0 |

Development of a suitably-strengthened ophthalmic lens has received emphasis from recent federal requirements that such ophthalmic lenses pass a minimum impact strength test. In accordance with these requirements, a lens to be suitable must withstand the impact provided by dropping a ⅝ inch steel ball from a distance of 50 inches onto the convex surface of the glass lens. The lenses of the present invention can be suitable strengthened using an ion exchange process as described so that such lenses will reproducibly pass the above test and can be characterized as having a compressively stressed surface layer that is at least about 60 microns in depth in which the surface layer is compressively stressed so as to provide a modulus of rupture of at least 15,000 pounds per square inch. The corresponding counter tensile stress which is necessarily generated in a central zone of the lens within the compressively stressed surface layer should be maintained below 3 kilograms per square millimeter.

The following examples illustrate the various aspects of the invention but are not intended to limit it. Where not otherwise specified throughout this specification and claims, temperatures are given in degrees centigrade and parts are by weight. The glasses disclosed in this invention were made in platinum crucibles using standard glass making techniques. The raw materials consisted of ophthalmic grade or high purity silica, aluminum hydroxide, nitrate and carbonates of sodium and potassium, zinc oxide, etc. which were thoroughly mixed prior to melting. A platinum crucible was used having a 500 gram capacity which was preheated to a temperature of 1430° in an electric furnace prior to addition of the raw materials.

After the glass had been melted, cast and annealed, the glass was allowed to cool in open air to room temperature and then inspected for stresses using a polariscope to evaluate squares cut to a size approximately 6 centimeters square. These squares were then cut to provide 6 centimeter diameter lens discs which were reheated to a temperature of about 700° C to about 750° C while in contact with a lens die so that the lens blank assumes the contour of the lens die; the process being termed "slumping." By this process, a prescription lens having a −5.00 diopter power was obtained. Together with these lens blanks, there were cut several flat pieces 2.5 centimeters by 2.5 centimeters by 0.2 centimeters. These flat pieces were surface polished and utilized to measure the transmission of the glass sample prepared. Spectral transmission was obtained on samples which were thoroughly cleaned prior to measurement using a household detergent followed by thorough rinsing in distilled water.

EXAMPLE I (control)

forming no part of this invention

In accordance with the preparation procedure described above, a glass was prepared having the following composition in parts on the oxide basis: silicon dioxide 68.5, sodium oxide 8.4, potassium oxide 8.9, calcium oxide 8.4, aluminum oxide 1.9, zinc oxide 2.9, titanium oxide 0.6 and antimony oxide 0.3. The glass was measured for spectral transmission both before and after an ion exchange treatment in which a glass plate 2.5 cm by 2.5 cm by 0.2 cm was exposed to a salt bath containing 90 percent by weight potassium nitrate and 10 percent by weight silver nitrate held at a temperature of 400° F; the glass plate being exposed for a period of 30 minutes in said bath. The spectral transmission of the glass prior to ion exchange is shown graphically in FIG. 1, curve 1 and the spectral transmission of the glass after ion exchanging under the conditions specified above is shown graphically as curve 2. The results indicate relatively little or no reduction in transmission of ultraviolet light having a wavelength below about 400 nanometers and a substantial reduction in transmission of visible light between 400 and 700 nanometers with the ion-exchanged glass sample.

EXAMPLE II

Figure 2:
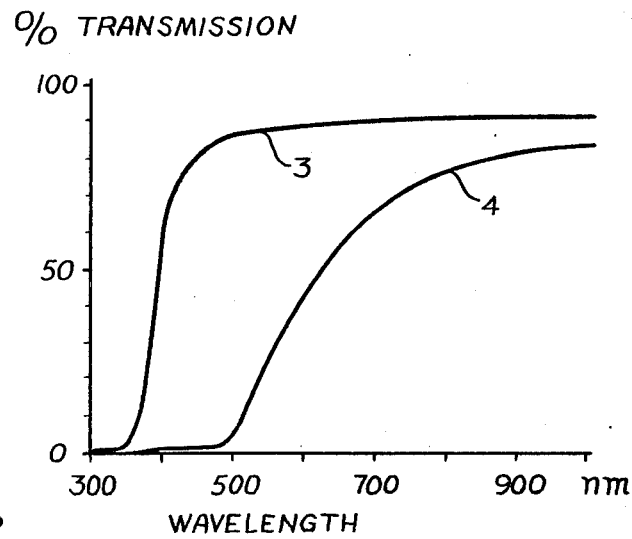
In FIG. 2 of the drawing there are shown curves showing the absorption characteristics of a silicate glass containing 5 percent cerium oxide which is representative of the glass compositions of the invention.

In accordance with the procedure outlined above, a glass suitable for use as an ultraviolet light filter was obtained by combining raw materials to prepare a glass having a composition in parts on the oxide basis of silicon dioxide 65.4, sodium oxide 7.9, potassium oxide 8.5, calcium oxide 8.1, aluminum oxide 1.8, zinc oxide 2.8, titanium dioxide 5.0 and cerium oxide 5.0. Subsequent to melting, annealing and cutting the glass into appropriate size samples as indicated above, the spectral characteristics of the glass were evaluated before and after ion exchanging for a period of 4 hours in a salt melt held at a temperature of 400° C. The composition of the salt melt was 98.3 weight percent potassium nitrate and 1.7 weight percent silver nitrate. The results of the spectral transmission evaluation are shown graphically in FIG. 2 wherein curve 3 indicates the spectral transmission of the glass prior to ion exchanging and curve 4 indicates the spectral transmission of the glass after ion exchanging under the conditions specified above. The sample thickness in Examples I and II is 2 millimeters. The results of the spectral analysis of the ion-exchanged sample indicates almost complete absorption of ultraviolet light below a wavelength of about 400 nanometers and substantial absorption of light up to about 500 nanometers with gradual reduction in absorption between 500 and 700 nanometers.

EXAMPLE III

Following the procedure of Example II, a glass sample was prepared having a composition in parts on the oxide basis as follows: silicon dioxide 67, sodium oxide 8, potassium oxide 8.8, calcium oxide 8.4, aluminum oxide 1.9, zinc oxide 2.9, titanium dioxide 0.5, and cerium oxide 2. Evaluation of the spectral transmission of this glass subsequent to preparation and processing as in Example II indicates a substantial reduction, subsequent to ion exchanging in accordance with the procedure of Example II, of the transmission of the glass below a wavelength of 400 nanometers and a gradual increase in transmission up to about 700 nanometers. The glass is suitable as a filter for ultraviolet light below a wavelength of about 400 nanometers, said filter having the characteristics of providing substantial transmission of visible light within the range of 400–700 nanometers.

EXAMPLE IV

In accordance with the procedure of Example II, a silicate glass composition is prepared having a total cerium oxide content of 10 parts by weight. The proportion of silicon dioxide is appropriately reduced over the composition of the glass of Example II to allow for the increased cerium oxide in the glass. The glass subsequent to melting, annealing and cutting is evaluated for spectral transmission and found to provide a glass having spectral transmission properties subsequent to ion exchanging in accordance with the procedure of Example II which renders it suitable as a filter for ultraviolet light.

While this invention has been described with reference to certain specific embodiments, it will be recognized by those skilled in the art that many variations are possible without departing from the scope and spirit of the invention.

I claim:

1. An ion exchange-strengthened silicate glass made from a glass making batch in which each 100 parts by weight on an oxide basis consisting essentially of:
   about 64 to about 75 parts silicon dioxide, about 5 to about 10 parts potassium oxide, about 4 to about 8 parts sodium oxide, about 4 to about 8 parts calcium oxide, and about 2 to about 10 parts cerium oxide.
   whereby upon ion exchanging at a temperature either above or below the strain point of said glass in a bath comprising salts of potassium and silver said glass provides an impact-resistant glass filter for ultraviolet light having a wavelength below about 400 nanometers and wherein said filter is transparent to light having a wavelength about 400 nanometers.

2. The ion exchange-strengthened silicate glass filter of claim 1 wherein said glass comprises by weight on the oxide basis up to 2 percent aluminum oxide, up to 3 percent zinc oxide and up to 0.5 percent titanium oxide.

3. An ion exchange-strengthened silicate glass according to claim 1 wherein said glass comprises in parts by weight on the oxide basis:

| silicon dioxide | 65.4 |
| sodium oxide | 7.9 |
| potassium oxide | 8.5 |
| calcium oxide | 8.1 |
| aluminum oxide | 1.8 |
| zinc oxide | 2.8 |
| titanium dioxide | 0.5 |
| cesium oxide | 5.0 |

4. An ion exchange-strengthened silicate glass according to claim 1 wherein said glass comprises in parts by weight on the oxide basis:

| silicon dioxide | 67 |
| sodium oxide | 8 |
| potassium oxide | 8.8 |
| calcium oxide | 8.4 |
| aluminum oxide | 1.9 |
| zinc oxide | 2.9 |
| titanium dioxide | 0.5 |
| cerium oxide | 2 |

5. An ion exchange-strengthened silicate glass according to claim 1 wherein said glass comprises in parts by weight on the oxide basis 10 parts of cerium oxide.

6. The process of producing a silicate glass filter for ultraviolet light comprising ion exchange strengthening a silicate glass made by preparing a silicate glass making batch in which each 100 parts thereof by weight on an oxide basis consisting essentially of: about 64 to about 75 parts silicon dioxide, about 5 to about 10 parts potassium oxide, about 4 to about 8 parts sodium oxide, about 4 to about 8 parts calcium oxide, and about 2 to about 10 parts cerium oxide wherein said ion exchange is conducted at a temperature either above or below the strain point of said glass in a bath comprising salts of potassium and silver and whereby said glass provides an impact-resistant glass filter for ultraviolet light having a wavelength below 400 nanometers wherein said filter is transparent to light having a wavelength above 400 nanometers.

7. The process of claim 6 wherein said silicate glass comprises in parts by weight on the oxide basis:

| silicon dioxide | 65.4 |
| sodium oxide | 7.9 |
| potassium oxide | 8.5 |
| calcium oxide | 8.1 |
| aluminum oxide | 1.8 |
| zinc oxide | 2.8 |
| titanium dioxide | 0.5 |
| cesium oxide | 5.0 | and wherein said ion exchange strengthening is conducted at a temperature of about 350° C to about 450° C in a bath comprising silver nitrate and potassium nitrate.

8. The process of claim 7 wherein said bath comprises 98.3 weight percent potassium nitrate and 1.7 weight percent silver nitrate and said process is conducted at a bath temperature of 400° C over a period of 4 hours.

* * * * *

UNITED STATES PATENT OFFICE
CERTIFICATE OF CORRECTION

PATENT NO. : 4,022,628
DATED : May 10, 1977
INVENTOR(S) : Emil W. Deeg

It is certified that error appears in the above-identified patent and that said Letters Patent are hereby corrected as shown below:

On the last page of the patent, column 8, lines 5 and 48 reading:

"cesium oxide   5.0"

should read:

--cerium oxide   5.0--

Signed and Sealed this second Day of August 1977

[SEAL]

Attest:

RUTH C. MASON
Attesting Officer

C. MARSHALL DANN
Commissioner of Patents and Trademarks